United States Patent [19]

Haring et al.

[11] 3,778,775

[45] Dec. 11, 1973

[54] MICROPROGRAMMED TERMINAL

[75] Inventors: Donald R. Haring, Concord; Paul A. King, Cambridge, both of Mass.

[73] Assignee: Computek, Inc., Cambridge, Mass.

[22] Filed: May 10, 1971

[21] Appl. No.: 141,767

[52] U.S. Cl. .......... 340/172.5
[51] Int. Cl. .......... G06f 3/14
[58] Field of Search .......... 340/172.5

[56] References Cited

UNITED STATES PATENTS

| | | | |
|---|---|---|---|
| 3,488,634 | 1/1970 | Mager | 340/172.5 |
| 3,643,223 | 2/1972 | Ruth et al. | 340/172.5 |
| 3,670,311 | 6/1972 | Aumann et al. | 340/172.5 |
| 3,675,208 | 7/1972 | Bard | 340/172.5 |
| 3,307,156 | 2/1967 | Durr | 340/172.5 |
| 3,534,338 | 10/1970 | Christensen et al. | 340/172.5 |
| 3,593,316 | 7/1971 | Frieband et al | 340/172.5 |
| 3,315,235 | 4/1967 | Carnevale et al. | 340/172.5 |
| 3,389,404 | 6/1968 | Koster | 340/172.5 |
| 3,626,382 | 12/1971 | Pedersen et al. | 340/172.5 |

*Primary Examiner*—Paul J. Henon
*Assistant Examiner*—Melvin B. Chapnick
*Attorney*—Morse, Altman & Oates

[57] ABSTRACT

A microprogrammed alphanumeric, computer display terminal comprises a keyboard control, a display oriented single-bus computer, and a display. The single-bus computer includes a processor bus operator, a micro-instruction decoder, and a microprogrammed read-only-memory. Instruction code signals from the keyboard control or from peripheral equipment are applied to a source bus. The processor bus operator accepts data from the source bus and an auxiliary operator register; modified that data in accordance with a computationally complete instruction set; and returns the process data to a destination bus. The micro-instruction decoder includes logic circucits to convert and decode the data stored in read-only memory into signals required by the bus operator in order to enable the processor to execute the selected instruction. The product of the executed instruction is presented on the display.

22 Claims, 6 Drawing Figures

INVENTORS
DONALD R. HARING
PAUL A. KING
BY Morse, Altman & Oates
ATTORNEYS

INVENTORS
DONALD R. HARING
PAUL A. KING
BY Morse, Altman & Oates
ATTORNEYS

INVENTORS
DONALD R. HARING
PAUL A. KING
BY *Morse, Altman & Oates*
ATTORNEYS

INVENTORS
DONALD R. HARING
PAUL A. KING
BY Morse, Altman & Oates
ATTORNEYS

INVENTORS
DONALD R. HARING
PAUL A. KING
BY
Morse, Altman & Oates
ATTORNEYS

MICROPROGRAMMED TERMINAL

BACKGROUND OF THE INVENTION

1. Field of Invention:

The present invention relates generally to computer terminals and, more particularly, is directed towards a microprogrammed, alphanumeric, single-bus computer display terminal.

2. Description of the Prior Art:

Several manufacturers have designed and developed display terminals which are computer controlled. Such manufacturers purchase a general purpose computer and design the terminal circuitry to operate with that computer. That is, the terminal electronics are designed to operate with a particular computer. Generally, such general purpose computers require a control line for checking the status of the device prior to execution of a command. For example, general purpose computers provide the means for flagging an instruction before the instruction is executed. In consequence, the terminal electronics must be designed to perform auxiliary functions inherent in the general purpose computer prior to execution of the primary function desired. Accordingly, such terminals have suffered from the disadvantage that they are unduly complex in design and expensive in production.

SUMMARY OF THE INVENTION

An object of the present invention is to provide an inexpensive and expedious microprogrammed computer display terminal having a single-bus computer which is particularly designed for operation with the display terminal electronics. That is, the present invention provides a single-bus computer that is expecially configured to handle the terminal electronics. The display terminal is characterized by a keyboard control, a display oriented single-bus computer, and a display. An input/output unit is provided as an interface between the terminal and peripheral equipment. The single-bus computer includes a processor bus operator, a micro-instruction decoder, and a microprogrammed read-only-memory. Command signals from the keyboard or from the peripheral equipment are applied to a source bus. The processor bus operator accepts data from the source bus and from an auxiliary operator register; modifies that data in accordance with a computationally complete instruction set; and returns the process data to a destination bus. The term single bus computer arises from the fact that the source bus and destination bus, taken collectively, denote a single data bus. The read-only microprogrammed memory, which stores hardwired programs, handles all the permanent processing, data transfer, and diagnostic tasks of the terminal. The micro-instruction decoder includes logic circuitry to convert and decode the data from the read-only memory into the signals required by the processor bus operator in order to enable the processor bus operator to execute the instruction. The product of the executed instruction is presented on the display. The combination of processor bus operator, microprogrammed read-only memory, and micro-instruction decoder is such as to provide a versatile and inexpensive display terminal.

The invention accordingly comprises the system possessing the construction, combination of elements, and arrangement of parts that are exemplified in the following detail disclosure, the scope of which will be indicated in the appended claims.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF THE INVENTION

Figure 1:
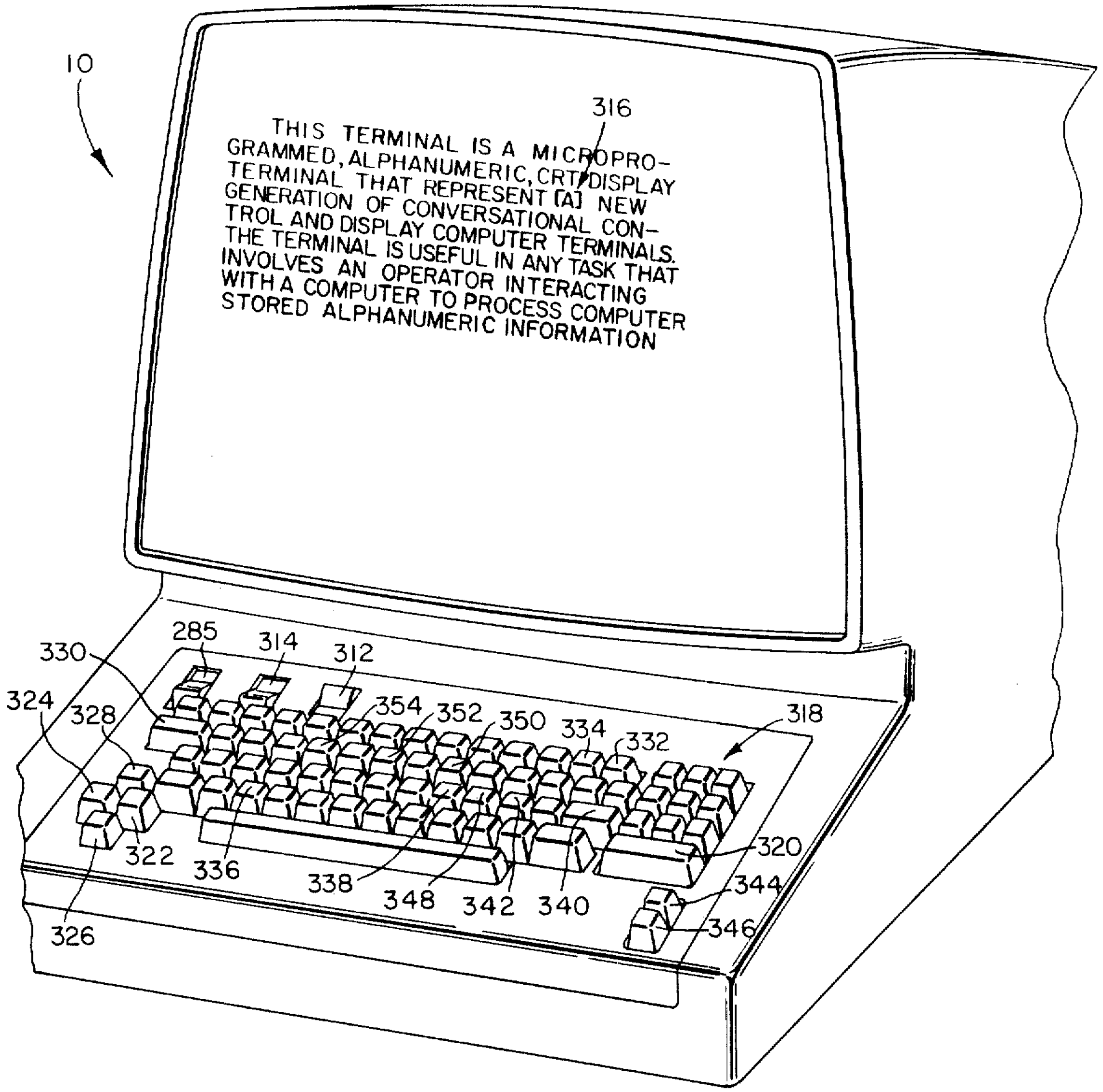
FIG. 1 is a perspective of a microprogrammed terminal made according to the invention.

A programmable terminal, as illustrated in FIG. 1, comprises a keyboard for generation of instruction codes, a single-bus computer for processing the instruction codes, and a display for presenting the processed codes. The single-bus computer includes a processor bus operator, a micro-instruction decoder and a read-only memory. The keyboard or peripheral equipment generate instruction codes which are applied to a source bus. The processor bus operator accepts the data from the source bus and modifies the data in accordance with a computationally complete instruction set. The micro-instruction decoder converts and decodes data stored in the read-only memory into signals required by the processor bus operator. The processed data generated by the processor bus operator is applied to a destination bus which is further connected to a character generator. The signals are fed to the display for presentation of the processed instruction codes as alphanumeric symbols.

Figure 2:
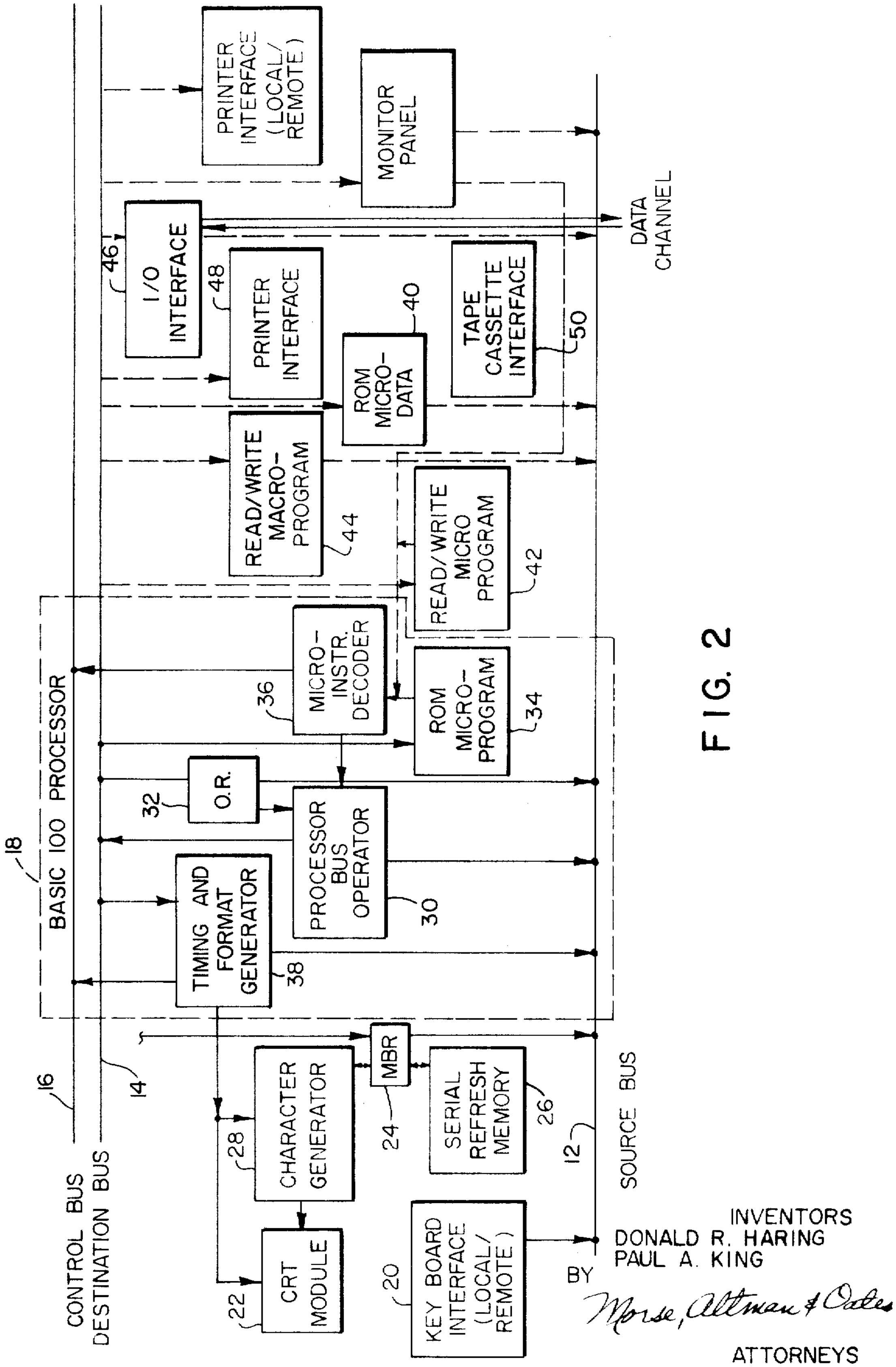
FIG. 2 is a block diagram of the electronics of FIG. 1.
Figure 3:
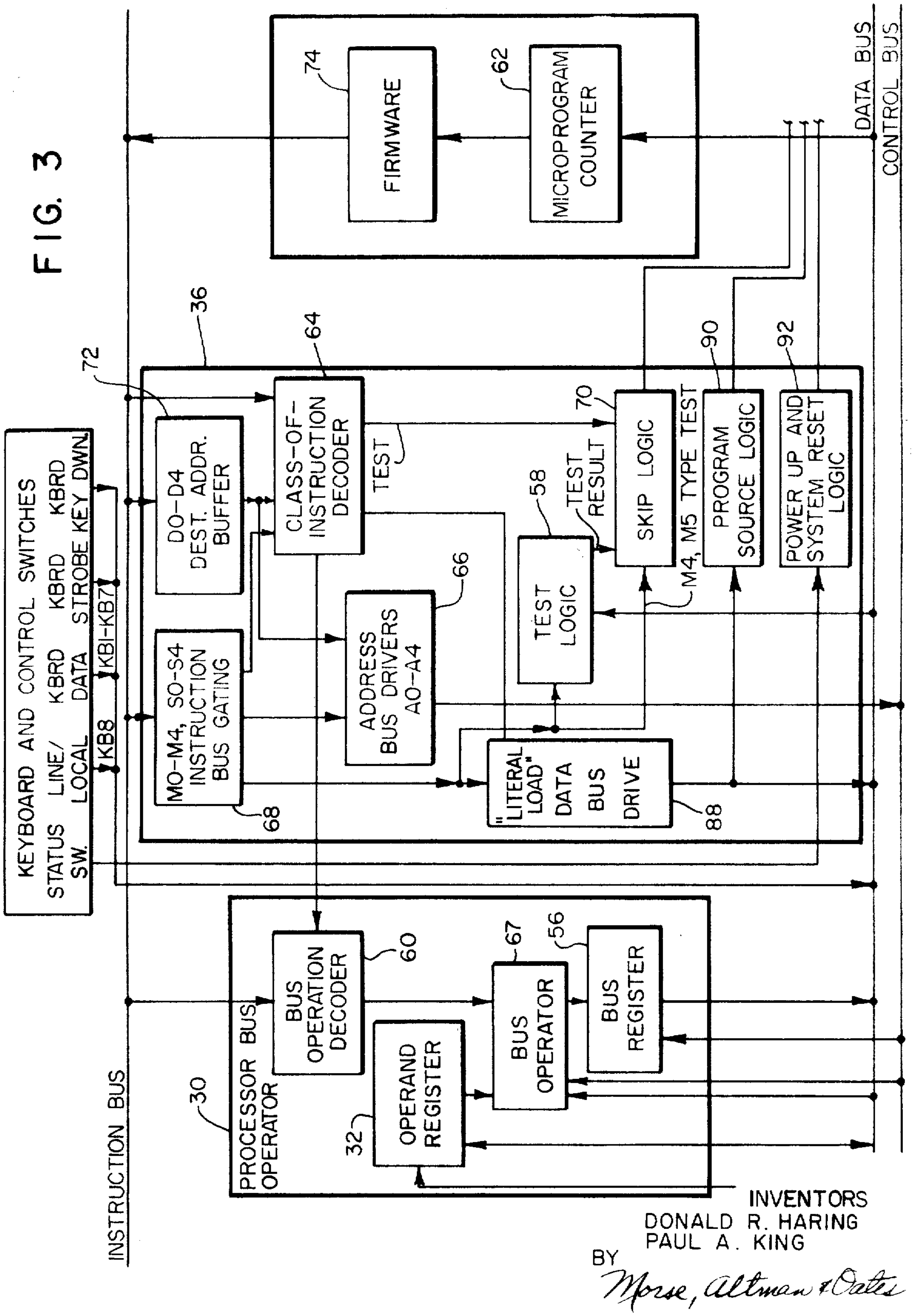
FIG. 3 is a detailed block and schematic diagram of FIG. 2.
Figure 4:
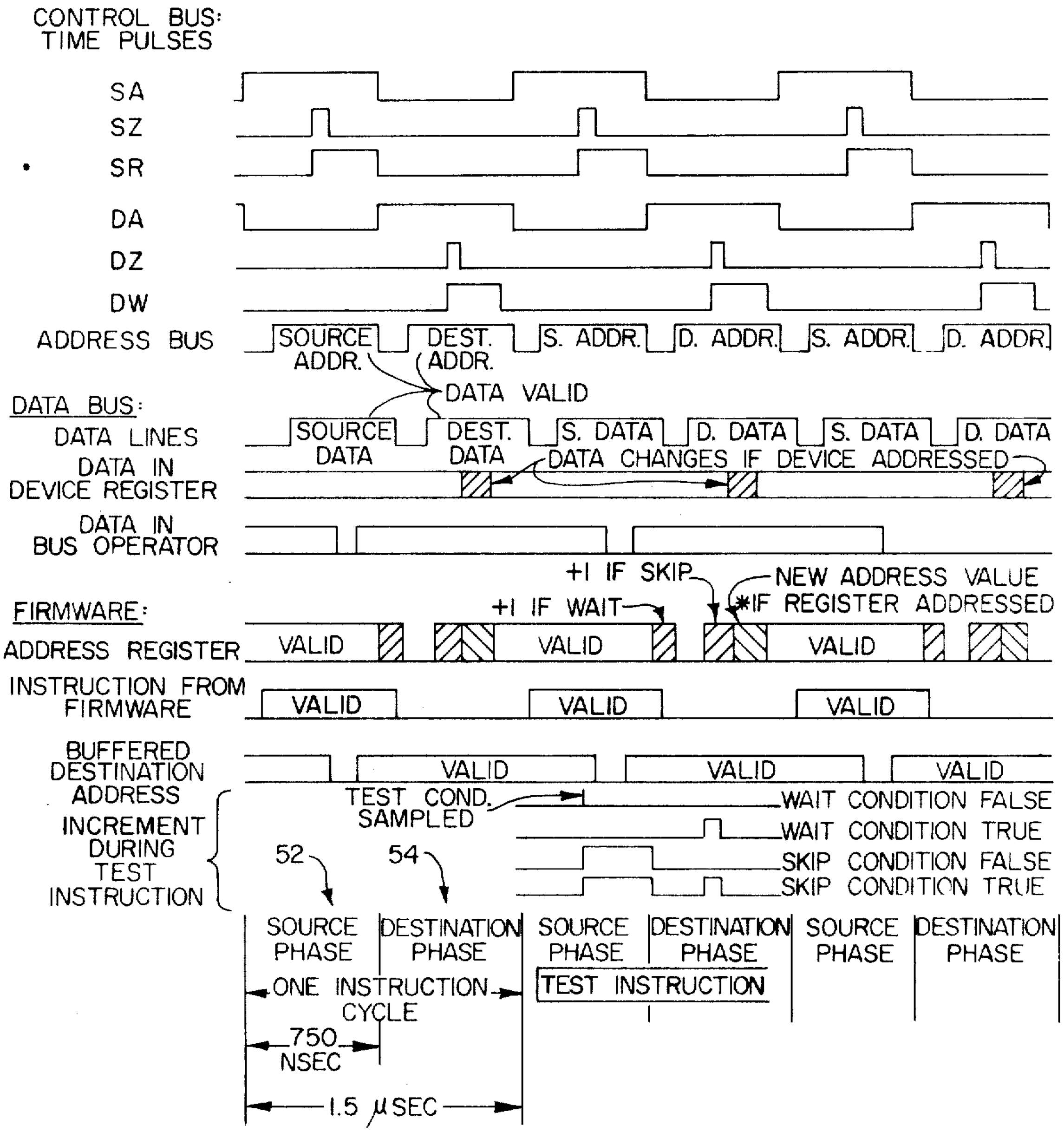
FIG. 4 is a timing diagram of the terminal.

Referring now to the drawings, particularly FIGS. 1 and 2, there is shown a microprogrammed terminal 10 having a source bus 12 to which data is supplied, a destination bus 14 from which data is received, and a control bus 16 for addressing and controlling the subsystem of terminal 10. Taken collectively, the source bus and the destination bus is a data bus, hence the term single-bus computer. For clarity, in FIG. 2, source bus 12 and destination bus 14 are shown as separate buses. In FIG. 3, the source bus and destination bus are shown as a single data bus, the timing relationship between the source data and destination data applied to the data bus is illustrated in FIG. 4. Generally, the subsystems of terminal 10 include a single-bus processor 18, a keyboard 20, a cathode-ray tube 22, a memory buffer register 24, a serial read write refresh memory 26, a character generator 28, a processor bus operator 30, an operand register 32, a read-only microprogrammed memory 34, a micro-instruction decoder 36, a timing and format generator 38, a read-only microdata memory 40, a read/write microprogrammed memory 42, and a read/write macroprogram memory 44. Terminal 10 includes also an input/output interface 46, a printer interface 48, and a tape cassette interface 50, for control of peripheral equipment. Keyboard 20, which is connected to source bus 12, operates as a source of data and may be local or remote to the terminal. Cathode-ray tube 22, which is connected to timing and format generator 38 and character generator 28, is a destination of the data and accepts graphical character and information for presentation. Memory buffer register 24, to which the contents of serial refresh memory 26 circulate, operates both as a source and a destination of data and drives character generator 28. Serial refresh memory 26 stores a complete page of text which is displayed on the face of cathode-ray tube 22. Character generator 28 creates the specific alphanumeric characters displayed and acts as a destination of data from memory buffer register 24 on a cycle steal basis. Processor bus operator 30 accepts data from source bus 12 and operand register 32, modifies the data in accordance with a computationally complete instruction set as specified by micro-instruction decoder 36, and returns the processed data to destination bus 14. Read-only microprogrammed memory 34, which communicates with the data and control buses, handles all permanent processing, data transfer, and diagnostic tests of the terminal. Preferably, microprogrammed memory 34 stores hardwired programs and is modularly replacable. Read-only microdata memory 40 is connected to the data buses and is used for such tasks as code conversion in adapting the terminal to several different communication codes. Read/write microprogram memory 42 communicates the data and control buses and operates to establish micro-instructions under program controlled. As hereinafter described, micro-instruction decoder 36 includes logic circuitry to convert data from read-only memory 34 into signals required by processor bus operator 30 and the other subsystems connected to the data and control buses; logic circuits to decode the instruction type (Test, Literal Load, or Data Transfer) from the data in the read-only memory; and circuitry for decoding the test instructions to enable the processor to execute this particular instruction. Read/write macroprogram memory 44 communicates with all buses and is used to program the terminal in the field using macro-instructions which are then interpreted by the microprograms for execution. Input/output interface 46 communicates with the data buses as well as with communication lines, a multiplexer, or other terminals, for example.

The micro-instruction level consists of precisely these instructions that can be executed directly by processor 18, such as data transfer, data loading, and data testing instructions. The majority of simple applications, such as Teletype replacement can be conveniently handled by the program which is entirely written using the above micro-instructions. Typically such a program is hard-wired in read-only memory 34. Read/write microprogram 42 is provided so that microprograms may be altered.

The macro-instructin level consists of instructions which are developed for the users application and are of a higher level than the processor micro-instruction levels. For example, the micro-instruction (Scroll) requires a subroutine of micro-instructions, whose overall effect is scrolling the display face of cathode-ray tube 22; i.e., shifting the text upwards one line at a time. The presence of macro-instructions allows the writing of complex and powerful programs for the user's application in the user's language. Since macro-instructions control the execution of a large number of micro-instructions, it follows that the memory requirements at the macro level are substantially reduced, whereby complex and sophisticated macroprograms are written in small memory modules. An immediate consequence of this powerful structure is a significant reduction in the per-unit memory cost and the per-unit terminal cost.

Referring now to FIG. 3, it will be seen that terminal 10 communicates with both internal and external devices by means of a 10-bit word-parallel data bus and a 11-bit control bus. In the following discussion, positive logic signals (i.e., the more positive of the two signal levels is a logical 1 and the other signal level is a logical 0) are identified by a plus symbol following the signal name and negative logic signals (i.e., the more negative of the two signal level is a logical 1 and the other signal level is a logical level 0) are identified by a minus symbol following the signal name. For example, the address bus is positive logic so address bus bit *i* becomes Ai+. Similarly, the data bus is negative logic so that the data bus bit *j* becomes BJ −. Processor 18 provides the following three fundamental operations:

a. Program control - a binary constant is transferred to a selected device under program control (literal load instruction).
b. Program test - the status of a selected device is tested by processor 18 under program control (test instruction).
c. Single-word data transfer - a single word of data is transferred between two selected devices, which may be internal to terminal 10 and/or peripheral controllers (transfer instruction).

The relative timing relationship among the bus signals at processor 18 are illustrated in FIG. 4. It is to be noted that all signals are centered about a source phase 52 and a destination phase 54.

The data bus is a 10-bit bi-directional input/output channel used by the terminal to transmit binary constants and data between processor 18 and the terminal subsystems. The data bus is used both during the source phase and destination phase. During the source phase, the data from the source device is loaded into a bus register 56; and during the destination phase, data from bus register 56 which has modified in accordance with the instructions in decoder 36 and the contents of operand register 32 via a bus operator 67 is applied to the destination device. The destination bus is designated B0 through B9.

The address bus, designated A0+ through A4+, is a 5 bit unit uni-directional input/output channel used by the terminal to transmit either the data source address or the data destination address to all device controllers connected to this bus. By way of example, typical pulse designations and characteristics are delineated below. Source Address, SA+, is a 750 nanosecond positive pulse generated by processor 18 to indicate the all connector device controllers that the address bus contains the address of the devices that is to place data onto the data bus. For a LITERAL LOAD instruction, the data bus is ignored during the source phase. Source Read, SR+, is a 350 nanosecond positive pulse generated by the processor to indicate to the address device controller that the processor is reading the data bus into register 56. Source Zero, SZ+, is a 100 nanosecond positive pulse generated by the processor for use by the connected device controllers during the source phase. Destination Address, DA+, is a 750 nanosecond positive pulse generated by the processor 28 to indicate to all connected device controllers that the address bus contains the address of the device that is to receive data from the data bus. For a test instruction, the data bus is analyzed by a test logic 58 which has address 00 000. It is to be noted that DA is the complement of SA. Destination Write, DW+, is a 250 nanosecond positive pulse generated by the processor to indicate to the address device controller that the data bus should be read. Destination Zero, DZ+, is a 100 nanosecond positive pulse generated by the processor coincident with the leading edge of DW for use by the connected device controller to reset any register before it is loaded from the data bus.

For a fuller understanding of the operation of processor 18, reference is made to the following description of how an instruction is performed by processor 18 which includes timing and format generator 38, processor bus operator 30, operand register 32, micro-instruction decoder 36, test logic 58, a microprogrammed counter 62, and a skip logic 70. Timing and format generator 38 provides control-bus signals. Bus operator 67, which is under the control of micro-instruction decoder 36 and operand register 32 modifies the data during a transfer instruction. Micro-instruction decoder 36 governs the class of instruction to be executed; generates the source address, destination address, and commands the bus modifier during a transfer instruction; or generates the destination address and 10-bit binary constant data bus during a literal load instruction; or commands test logic 58 during the test instruction. Skip logic 70, which is driven by test logic 58, indicates whether the test condition of the data bus has been satisfied. The skip logic increments microprogram counter 62 zero, one, or two times dependent upon whether the test condition is not or is satisfied, and dependent upon whether the test instruction is a skip or wait.

Microprogrammed counter 62, which stores the address of the current instruction that is being performed, generates a decoded signal for driving microprogram read-only memory 34. The microprograms that are to be executed are stored in read-only memory 34.

The instruction bus is in the following format:

| | | | |
|---|---|---|---|
| $D_4\ D_3\ D_2\ D_1\ D_0$ | $M_5$ | $M_4M_3M_2M_1M_0$ | $S_4S_3S_2S_1S_0$ |
| Transfer Instr. (Dest. Addr.) | 0 | (modification) | (Source Addr.) |
| Literal Load Instr. (Dest. Addr.) | 1 | 10-Bit Data | |
| Test Instr. (0) | | (Test Condition) | (Source Addr.) |

By way of example, the operation of the system using a transfer instruction will now be described. Approximately 100 nanoseconds into the source phase of the instruction to be executed, which in this case is a transfer instruction, instruction decoder 64 generates the source address for address bus 66. During this same period of time, a destination address 72 has been buffered because the output signal from firmware 74 is not valid for the entire destination phase of the instruction. During the source phase, the class of instruction decoder 64 drives bus operation decoder 60 with an OPERATE signal in order to activate the decoder. In consequence, bits $M_0$ through $M_5$ of the instructions are sent to the decoder to select a modification. When the source device, identified by this source address, places its output on the data bus, bus register 56 is loaded with the modified data from the source device at the occurrence of the source read pulse SR. At the destination phase, identified by pulses DA, address bus 66 is driven by destination address buffer 72, and the signal at output of bus register 56 is placed on the data bus. The destination device, identified by its address, reads the data bus during the occurrence of the destination write pulse, DW, and the instruction is complete. It is to be noted that, if the micro-address register was not the destination, then it contains the next address in sequence because skip logic 70 created an increment pulse at the trailing edge of the SR pulse. On the other hand, if the micro-address register were the destination, the program does a jump instruction and the new value of the register will have become stable at the next time interval. The reason for this is that the register is loaded during the occurrence of the DW pulse, which is at least 100 nanoseconds before the end of the destination phase.

If the instruction retreived from the firmware is a literal load instruction, i.e., the destination address is not 00 000 and $M_5$ of the modifier is 1, the 10 least significant bits of the instruction are placed on the data bus by means of instruction decoder 30 during the source phase of the instruction. In addition, the operate signal is not sent to the bus decoder, in consequence no modification of data takes place when the data bus is loaded into the bus register. All other conditions and signals are as specified in the transfer instruction.

If the instruction retreived from the firmware is a test instruction, the source phase is as described and test logic 58 analyzes the data on the data bus created by the source device during the SZ pulse. The operation during the destination phase of the test instruction is dependent upon the outcome of the test and whether the test instruction is a WAIT or SKIP instruction. At the end of the test phase, micro-address register 62 can have one of three addresses: (the address containing the executed instruction is assumed to be P)

P, a WAIT instruction and the condition is not satisfied; or

P+1, a WAIT instruction and the condition is satisfied, or a SKIP instruction and the condition is not satisfied; or P+2, a SKIP instruction and the condition is satisfied.

Test logic 58 and skip logic 70, generate the necessary increment pulse to micro-address register 62.

Figure 5:
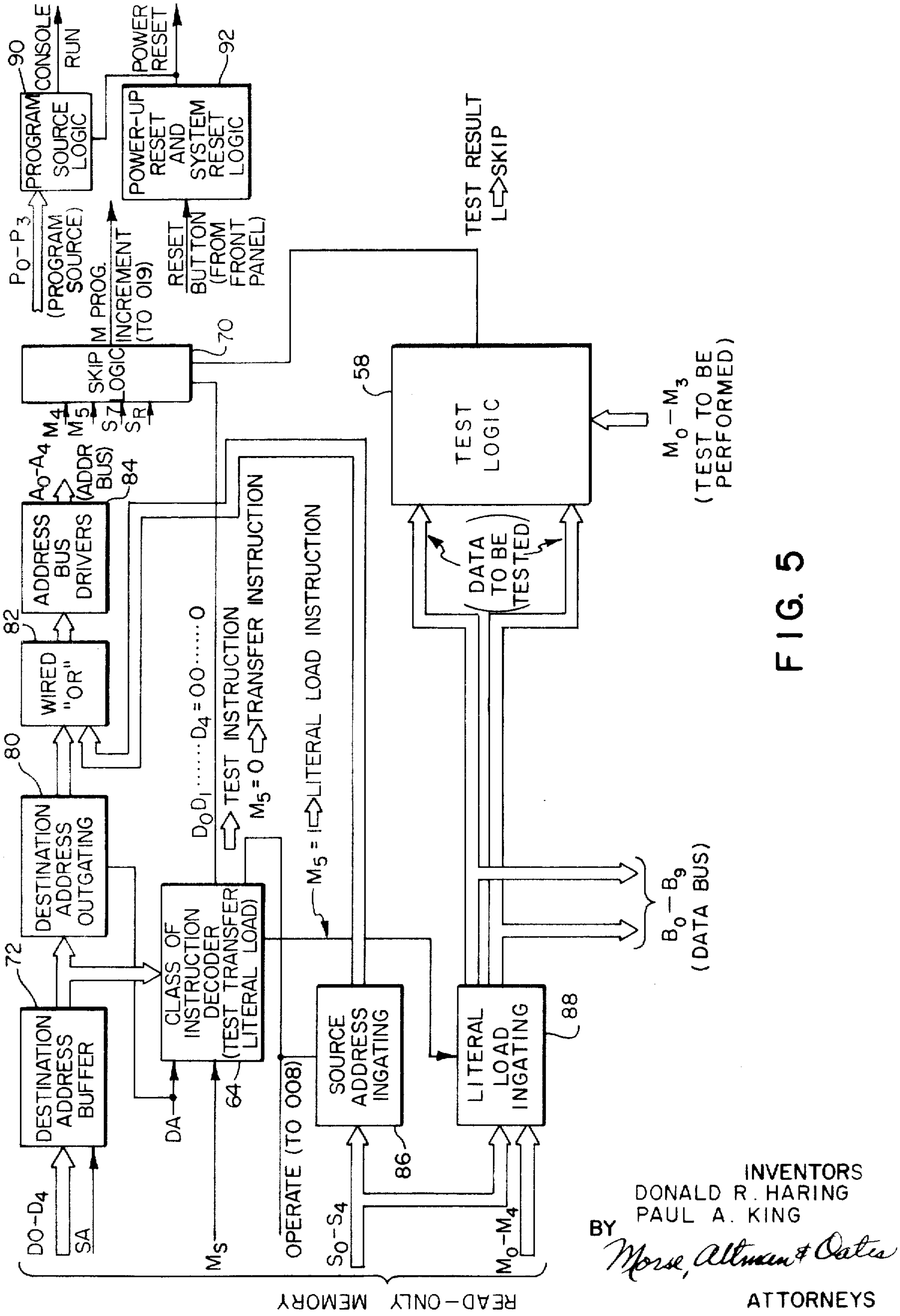
FIG. 5 is a block diagram of the micro-instruction decoder illustrated in FIGS. 2 and 3.
Figure 6:
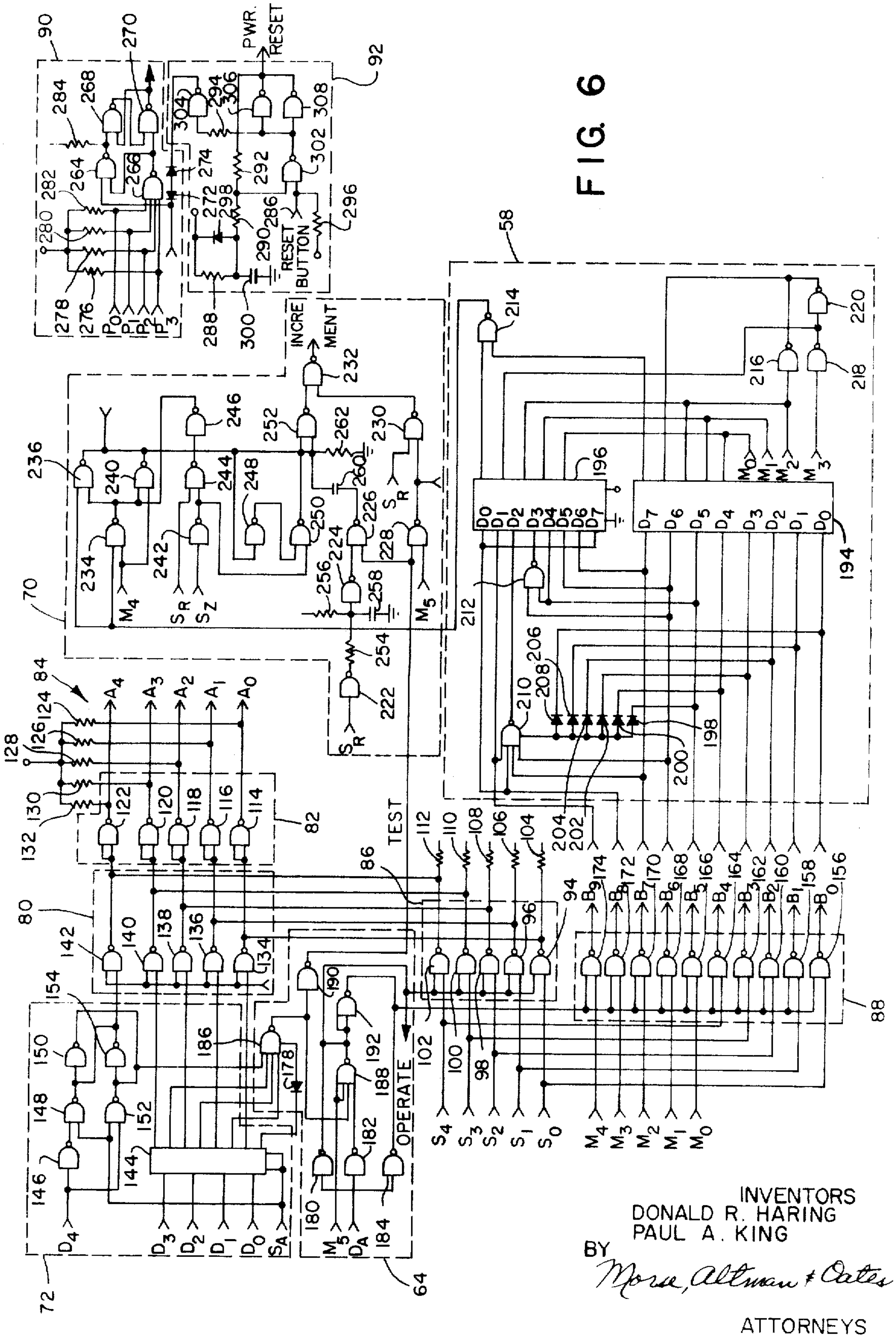
FIG. 6 is a detailed schematic diagram of the micro-instruction decoder shown in FIG. 5.

Referring now to FIGS. 5 and 6, it will be seen that micro-instruction decoder 36 comprises a destination address buffer 72, a destination address outgating 80, wired OR circuits 82, address bus drivers 84, instruction decoder 64, a source address ingating 86, a literal load ingating 88, test logic 58, skip logic 70, a program source logic 90, and power up and system reset logic 92. As previously indicated, the micro-instruction decoder converts and decodes the data stored in read-only memory 34 into signals required by processor 18 in order to enable the processor to execute the selected instruction.

The instructions from the read-only memory are processed as follows: the source address field $S_0$ through $S_4$ is transferred to address lines $A_0$ through $A_4$ of the control bus through source address ingating 86, wired OR circuits 82, and address bus drivers 84. Source address ingating 86 includes NAND gates 94, 96, 98, 100, and 102. Source address fields $S_0$, $S_1$, $S_2$, $S_3$, $S_4$ are applied to NAND gates 94, 96, 98, 100, and 102 respectively. That is, source address field $S_0$ is applied to NAND gate 94, source address field $S_1$ is applied to NAND gate 96, and so on. A bias level, for example 5 volts, is applied to the output of each NAND gate 94, 96, 98, 100, and 102 through resistors 104, 106, 108, 110, and 112, respectively. The output terminal of each NAND gate 94, 96, 98, 100, and 102 is connected to the input terminals of NAND gate 114, 116, 118, 120, and 122, respectively, of address bus driver 34. A bias, for example 5 volts, is applied to the output terminal of each NAND gate 114, 116, 118, 120, and 122 through resistors 124, 126, 128, 130, and 132, respectively. The destination address field $D_0$ through $D_4$ is buffered for use during the destination phase of the instruction in destination address buffer 72. The signals at the output terminals of destination address buffer 72 are applied to address lines $A_0$ through $A_4$ via destination address outgating 80 and address bus drivers 84. Destination address outgating 80 includes NANDS gates 134, 136, 138, 140, and 142. The output terminals of NAND gates 134, 136, 138, 140, and 142 are connected to the input terminals of NAND gates 114, 116, 118, 120, and 122, respectively. Destination address buffer 72 includes a clock 144 and NAND gates 146, 148, 150, 152, and 154. The destination address fields $D_0$, $D_1$, $D_2$, and $D_3$ are applied to the input terminals of NAND gates 134, 136, 138, and 140, respectively through clock 144. The destination address field $D_4$ is applied to the input terminal of NAND gate 142 through NAND gates 146, 148, 150, 152, and 154. The modifier fields $M_0$ through $M_5$ are routed to class-of-instruction decoder 64, test logic 58, and bus operator 30. In addition, source fields $S_0$, $S_1$, $S_2$, $S_3$, $S_4$ and modifier fields $M_0$, $M_1 M_2$, $M_3$, $M_4$ are gated through literal load ingating 88 to the data bus for use as literal data during a LITERAL LOAD instruction. Literal load ingating 88 includes NAND gates 156, 158, 160, 162, 164, 166, 168, 170, 172, and 174. Source field $S_0$, $S_1$ , $S_2$, $S_3$, and $S_4$ are applied to one input terminal of NAND gate 156, 158, 160, 162, and 164, respectively. Modifier fields $M_0$, $M_1$, $M_2$, $M_3$, and $M_4$ are applied to one input terminal of NAND gate 166, 168, 170, 172, and 174, respectively. The other input terminal of each of the NAND gates in literal load ingating 88 are connected to class of instruction decoder 64.

Class of instruction decoder 64 determines whether the instruction is a TEST instruction (destination address is 00000), LITERAL LOAD instruction (destination address is not 00000 and bit $M_5$=1), or DATA TRANSFER instruction (neither of the preceeding conditions are true), and generates the appropriate control levels. Class of instruction decoder 64 includes; a diode 178, and NAND gate 180, 184, 186, 188, 190, and 192. The input terminals of NAND gate 186 are connected to clock 144 and the output terminals of NAND gates 150 and 152. The destination address DA is applied to the input terminals of NAND gate 180, 182, and 184. Modifier field $M_5$ is connected to the input of NAND gate 188. The output terminal of NAND 186 is connected to the input terminals of NAND gates 188 and 190. The output terminals of NAND gates 180 and 188 are connected to the input terminals of NAND gates 94, 96, 98, 100, and 102. The output terminals of NAND gates 184 and 192 are connected to the other input terminals of NAND gates 156 through 174 in literal load ingating 88.

During a LITERAL LOAD instruction source phase, the source fields $S_0$ through $S_4$ and the modifier fields $M_0$ through $M_4$ are applied to the data bus through literal load ingating 88. Neither the source nor destination address gating is enabled at this time, in consequence the address lines are 00000 and no device responds. During the destination phase, literal data is placed on the data bus and the address from the destination address buffer 72 is placed on the address line to select the desired destination.

During the source phase of a DATA TRANSFER instruction, the source field of the instruction is gated onto the address lines. Class of instruction decoder 64 generates an OPERATE level which commands the bus operator to perform the specified function. Data is placed on the data bus through gating contained in the selected device; no data path on the instruction decoder is used. During the destination phase, operation is identical to that of the LITERAL LOAD instruction hereinbefore described.

During the source phase of the test instruction, a device is addressed in a manner similar to that described for the DATA TRANSFER instruction. Test logic 58 examines the information on the data bus in accordance with the conditions set by instruction bits $M_0$ through $M_3$. Test logic 58 comprises multiplexers 194 and 196; diodes 198, 200, 202, 204, 206, and 208; and NAND gates 210, 212, 214, 216, 218, and 220. The information on the data bus $B_0$ through $B_9$ is applied to multiplexers 194 and 196. Data bus instruction $B_6$, $B_7 B_8$, $B_9$ are applied to multiplexer 196 through NAND gate 210. $B_6$, $B_7$, $B_8$, $B_9$ are also applied directly to multiplexer 196. Data bus signals $B_5$ and $B_6$ are applied to multiplexer 196 through NAND gate 212, $B_5$ also being applied directly to multiplexer 196. Data bus instruction $B_0$ through $B_7$ are applied directly to multiplexer 194. Modifier fields $M_0$, $M_1$, and $M_2$ are applied to both multiplexers 194 and 196. In addition modifier fields $M_2$ and $M_3$ are applied to the enable terminal of each multiplexer via NAND gates 216, 218, and 220. Test logic 58 generates a TEST RESULT level to indicate whether the test condition is thus satisfied. This level is applied to skip logic 70 through NAND gate 214.

Skip logic 70 generates the increment pulse which cause the microprogram address register to advance to the next sequential instruction in the firmware. Skip logic 70 comprises NAND gates 222, 224, 226, 228, 230, 232, 234, 236, 240, 242, 244, 246, 248, 250, and 252. The input signals to skip logic 70 are the Source Zero SZ and Source Read SR timing pulses; the TEST LEVEL from instruction decoder 64; the TEST RESULT level from test logic 58; and instruction bits $M_4$ and $M_5$, the REVERSE and WAIT bits of the test function, respectively. Source Read SR timing pulses are applied to the input terminals of NAND gates 222 and 244. The output terminal of NAND gate 222 is connected through a resistor 254 to the input terminal of NAND gate 224, a bias level being applied to the input terminal of NAND gate 224 through a resistor 256. A capacitor 258 is connected between the junction of resistors 254, 256, and ground. The source read timing pulses are applied to an input terminal of NAND gate 244, the Source Zero pulse being applied to another input terminal of NAND gate 244 through NAND gate 242. The TEST RESULT level is applied to the input terminals of NAND gates 236 and 234. Modifier field $M_4$ is applied to another input terminal of NAND gate 234 and an input terminal of NAND gate 240, the output terminal of NAND gate 234 being connected to the other input terminals of NAND gates 236 and 240. The TEST LEVEL from instruction decoder 64 is applied to an input terminal of NAND gates 226 and 228. Modifier field $M_5$ and the output terminal of NAND gate 224 are applied to the other input terminals of NAND gates 228 and 226, respectively. The output terminal of NAND gate 226 is coupled to an input terminal of NAND gate 252 through a capacitor 260, a resistor 262 being connected between the junction of capacitor 260 and the input terminal NAND 252 and ground. NAND gate 228 is connected to NAND gate 230. NAND gates 230 and 252 are connected to NAND gate 232 which generates the increment pulse to the microprogrammed address register.

During a LITERAL LOAD or DATA TRANSFER instruction skip logic 70 generates one increment pulse to advance the firmware to the next sequential instruction. One increment pulse is also generated for a TEST instruction if the conditions are not satisfied, or a TEST-WAIT instruction if the conditions are satisfied. If the conditions are satisfied for a TEST instruction, two increment pulses are generated. The microprogram address register is thus incremented by two and the instruction following the test is skipped. If the conditions are not satisfied for a TEST-WAIT instruction, no increment pulse is generated. The processor thus repeats the TEST-WAIT instruction until the conditions tested become true.

Program source logic 90 decodes the program source bus and generates a CONSOLE RUN signal which enables the microprogram read-only memory. When a different code appears, the microprogram read-only memory relinquishes control of the instruction bus and allows another system to provide instructions for execution. Program source logic 90 comprises NAND gates 264, 266, 268, and 270; diodes 272 and 274; and resistors 276, 278, 280, 282, and 284. External connections $_0P_1P_2$, and $P_3$ are applied to their respective input terminals of NAND gate 266. A bias level is applied to the input terminals of NAND gate 266 through resistors 276, 278, 280, and 282. The Destinations Write DW signal is applied to one input terminal of NAND gate 264 and the signal at the output terminal of NAND gate 266 is applied to the other input terminal of NAND gate 264 and an input terminal of NAND gate 270. The output terminal of NAND gate 264 is connected to one input terminal of NAND gate 268, a bias level being applied to this input terminal of NAND gate 268 through resistor 284. The output terminal of NAND gate 268 is connected to the other input terminal of NAND gate 270 and the output terminal of 270 is connected to the other input of NAND gate 268. The CONSOLE RUN signal is presented at the output terminal of NAND gate 270. NAND gate 266 is coupled to power and system reset logic 92 through diode 272.

The power and system reset logic 92 detects power turn-on and the operation of a keyboard start switch 285 and generates a power reset level. Power up and system reset logic 92 includes a reset button 286; resistors 288, 290, 292, 294, 296; diode 298; capacitor 300; and NAND gates 302, 304, 306, and 308. A voltage is applied to the junction of the cathode of diode 298 and resistor 288. The anode of diode 298 and resistor 288 are connected to capacitor 300 and resistor 290, the other side of capacitor 300 being connected to ground. The free end of resistor 290 is connected to one side of resistor 292 and an input terminal of NAND gate 302. A voltage is applied to the other input terminal of NAND gate 302 through resistor 296. The output terminal of NAND gate 302 is connected to the input terminals of NAND gates 306 and 308 directly and to the input terminal of NAND gate 304 through resistor 294. The output terminal of NAND gate 304 is connected to the cathode of diode 274. The output terminals of NAND gates 306 and 308 are connected to the free end of resistor 292. The power reset level is presented at the output terminals of NAND gates 306 and 308. It is to be noted that all subsystems of the terminal 10 use this power reset level to initialize system states for proper operation.

OPERATION

FIG. 1 illustrates the position of the basic controls and keyboard of terminal 10. With the terminal plugged into the proper power and the data connection made, the user turns the terminal ON by actuating switch 285. The operator next makes a "MODE" selection by means of a selection switch 312. In LINE mode, data generated by the terminal is sent directly to the connected processor through the data channel. All data received by the terminal in this mode goes directly to the local storage of the terminal if the data is a character. If the received data is a control function, then the processor performs the proper operation. Control characters are normally not displayed on the CRT. In the LOCAL mode, all data generated by the terminal is sent directly back into the terminal as if it were received through the data channels. No data goes to the data channel connected to the data terminal; hence, LOCAL operation allows the user to do off-line operations even though the terminal is connected to a data port of a processor. LOCAL mode is very useful for testing and familiarizing the operator with the terminal.

A STATUS switch 314 on the keyboard panel sets the internal processor status. The purpose of this switch is to start the internal processor at the proper point in this program. Depressing this spring-return switch and releasing it sets the program counter 62 into the starting state. When the terminal is first turned on, this switch should be depressed. Depressing STATUS switch 314 erases the entire contents of the screen and places a cursor 316 in the upper left-hand corner of the screen. After switch 314 has been depressed and released, the terminal is ready to operate.

In the preferred embodiment, terminal 10 operates with the ASCII code. The usual computer service software for a terminal checks each code that the computer receives. If that code is an alphanumeric symbol then the code is echoed back to the terminal. If that code is a control code, then the software performs some routines and may or may not send combinations of alphanumeric symbols and control codes to the terminal.

It is to be noted that, in consequence of serial refresh memory 26, the time required by the terminal to execute various editing and control functions usually differs from the time required to assimilate a single character. Typically, terminal 10 operates with data rates up to 120 characters per second with no synchronization, and 71,500 characters per second with synchronization (with a synchronization latency of at most 8⅓ milliseconds). The assimilation time of an edit or control function means that the software must frequently place fill characters which the terminal ignores after edit and control functions. The number of fill characters is determined by the data rate and the time for the given edit or control functions.

Terminal 10 is configured to satisfy a user's specific requirements by the set of microprograms and macroprograms provided with the terminal. A minimal set of microprograms which allows the terminal to operate with a computer requires identification of any character space on the cathode-ray tube display face. Character spaces are identified by the cursor which is operated from the keyboard by entering the proper microprograms. Each microprogram is entered with the receipt by the terminal of a preselected code. The code is generated by the keyboard by depressing a special key 318 or by depressing a CONTROL key 320 plus an alphanumeric key. When the terminal is in LOCAL MODE, this code is transferred to the input of the terminal and the terminal responds as specified. When the terminal is in LINE MODE, this code is transferred to a connected computer. If the computer sends this code to the terminal, then the terminal responds as specified. In the following descriptions, it is assumed that the terminal is in LOCAL MODE.

The following is a possible set of cursor movement programs:

Cursor Right: Depressing key 322 moves the cursor one character place to the right.

Cursor Left: Depressing key 324 moves the cursor one character place to the left.

Cursor Down: Depressing key 326 moves the cursor down one line and to the beginning of that line. Alternately, the terminal could be programmed so that the cursor is moved down one line when key 326 is depressed.

Cursor Up: Depressing key 328 moves the cursor up one line and to the beginning of that line. Alternately, the terminal could be programmed so that the cursor is moved up one line when key 328 is depressed.

Home: Depressing key 330 moves the cursor to the beginning of the first line, i.e., the line at the top of the cathode-ray ray tube display face.

To increase the capability of the terminal, microprograms are added to complement the minimal set. Some possible microprograms are listed here. It is assumed that each microprogram is initiated by receipt of a preselected code. The code can be generated as described above.

Character Insert: This microprogram allows one to insert a character within a line of characters without removing any characters on the line except those which exceed the line length of the cathode-ray tube screen. These characters disappear from the screen and are eliminated from the memory of the terminal. The Character-Insert procedure is as follows: set the cursor at the character position in which the character is to be inserted. Depress a Character Insert key 332 and release it. This action creates space for the character that is to be inserted as follows: all characters to the left of the cursor position remain fixed, all characters to the right of that position are moved one character position to the right and the cursor position remains fixed. Depress the key for the character to be inserted. The character position at which the cursor was pointing now contains the inserted character.

Character Delete: By depressing a Character Delete key 334, all characters on the line to the left of the cursor remain the same, the character identified by the cursor is erased, and all characters on the line to the right of the cursor are moved one character space to the left. The cursor position remains fixed when the Character Delete key is depressed.

Character Erase: A character can be erased by depressing a space bar 336 or some key which places a non-fixable character in that position.

Erase to the End of a Line: When a key 338 is depressed, all characters on the line containing the cursor and to the right of the cursor are erased by replacing the character codes with NUL (all zero's) character.

Data on the cathode-ray tube screen can be tagged in the associative memory, whereby that data cannot be modified from the keyboard. This data is said to be "protected data." A typical use of protected data is when the operator is to fill out a form on the cathode-ray tube screen. The form would be protected data. The microprograms are arranged such that the cursor will never fall on protected data; that is, if the cursor is on line X, for example, and a Carriage Return key 340 is depressed, the cursor moves to the first unprotected data on line X + 1. This form of protected data is frequently called the "split screen."

Page Erase: A "Page" is one complete cathode-ray tube display. There are two modes for this microprogram. Mode 1 — the entire page is erased when a Page Erase key 342 is depressed (i.e., all character codes replaced with the NUL character). Mode 2 — The page is erased from the point of the cursor to the bottom of the page. The microprogram can be written such that protected data will or will not be erased when Page Erase key 342 is depressed.

Send Page: Again, two modes. Mode 1 — There is no protected data on the screen, so the entire contents on the cathode-ray tube display is sent to the computer. Mode 2— Protected data is on the screen, so only the unprotected data is sent to the computer.

Roll Up: When a Roll Up key 344 is depressed, line X becomes line X − $i$, line X − $i$ becomes line X − 2$i$, etc. Note that line 1 becomes line N ($i$−1), where N is the number of lines of characters. ($i \geq$ 24 1).

Roll Down: When a Roll Down key 346 is depressed, line X becomes line X + $x$, line X + $i$ becomes X + 2$i$, etc. Note that line N becomes line $i$, where N is the number of lines of characters. ($i \geq 1$).

Scroll: In scroll mode, the usual data entry point is on the next to the last line of the cathode-ray tube screen. When Carriage Return key 340 is depressed, all lines of data are moved up one line and the cursor still points to the next to the last line. Thus, new writing always take place on the next to last line. When a line of data reaches the first line on the screen, the next "Carriage Return" usually destroys that data, and the second line of data becomes the first line of data, etc. If desired, the first-line data that is usually destroyed can be sent to the connected computer or hard copy.

Vertical Tab: When a Vertical Tab key 348 is depressed, the cursor moves down the next row that has been identified by a previous vertical tab set.

Horizontal Tab: When a Horizontal Tab key 350 is depressed, the cursor moves to the next position on the line that has been identified by a previous horizontal tab set.

Here is: When a Here Is key 352 is depressed, the terminal automatically sends an identifying code to the computer.

Read Cursor: This microprogram is activated by receipt of a control code from the channel. The Read Cursor microprogram causes the row number and character number of the character position at which the cursor is presently setting to be transmitted to the channel.

Set Cursor: This microprogram is activated by receipt of a control code from the channel. The Set Cursor microprogram causes the cursor to be placed in a character position specified by the channel.

Copy: When a Copy Key 354 is depressed, a hard copy of the contents (or selected portions of the contents) of the cathode-ray tube screen is made for the user if the hard-copy option is contained within the system.

Clearly, generalization of the programs listed in the previous section are possible. For example, roll and scroll were assumed to be "vertical" operations, i.e., motions of screen data was vertical. It is also possible to program "horizontal" roll and scroll. If in the above descriptions, "blinking data" were substituted for "protected data," another set of programs is described. It will be appreciated that, terminal 10 can define and use tags to identify properties of data that is displayed on the cathode-ray tube. Finally, the capability of the terminal is more realized when editing operations such as word delete and sentence delete are programmed using a space and a period, respectively, to delineate data properties.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A computer display terminal comprising:

a. a source bus;

b. a destination bus, said source bus and said destination bus defining a single data bus;

c. a control keyboard operatively connected to said data bus for generating instruction signals;

d. a display oriented single-bus processor operatively connected to said data bus for processing said instruction signals;

e. a micro-instruction decoder operatively connected to said single-bus processor;

f. a microprogrammed read-only memory operatively connected to said micro-instruction decoder and said data bus;

g. a display operatively connected to said data bus;

h. said single-bus processor accepting data from said data bus, modifying said data in accordance with a computationally complete instruction set specified by said micro-instruction decoder and microprogrammed read-only memory, and returning the processed data to said data bus;

i. said processed data being applied from said data bus to said display for presentation of said instruction signals.

2. The terminal as claimed in claim 1 wherein said micro-instruction decoder includes logic circuit means operatively connected to said microprogrammed read-only memory for converting and decoding the data stored in said read-only memory into signals required by said single-bus processor in order to enable said processor to execute the selected instruction.

3. A microprogrammed display terminal comprising:

a. a source bus;

b. a destination bus, said source bus and said destination bus defining a single data bus;

c. means operatively connected to said data bus for generating an instruction code;

d. a processor bus operator operatively connected to said data bus for processing said instruction code;

e. a micro-instruction decoder operatively connected to said processor bus operator;

f. a microprogrammed read-only memory operatively connected to said micro-instruction decoder and said data bus; and g. display means operatively connected to said data bus for presenting said instruction code;

h. said instruction code being applied to said data bus;

i. said processor bus operator accepting data from said data bus, modifying said accepted data in accordance with a computationally complete instruction set as specified by said micro-instruction decoder and microprogrammed read-only memory, and returning the processed data to said data bus;

j. said processed data being applied to said display means for presentation via said data bus.

4. The terminal as claimed in claim 3 wherein said microprogrammed read-only memory includes means for storing hard wired programs.

5. The terminal as claimed in claim 3 wherein said micro-instruction decoder includes logic means to convert and decode the data stored in said read-only memory into signals required by said processor bus operator in order to enable said processor bus operator to execute said instruction code.

6. The terminal as claimed in claim 3 wherein said micro-instruction decoder includes a class-of-instruction decoder for determining test, literal load, and data transfer instructions and generating a control level representing the determined instruction.

7. A programmable display terminal comprising:

a. means for generating instruction codes;

b. single data bus means;

c. a single-bus computer operatively connected to said instruction codes generating means for processing said instruction codes, said instruction codes applied to said single-bus computer via said single data bus means, said single-bus computer including i. a processor bus operator for processing data, ii. a micro-instruction decoder operatively connected to said processor bus operator, and iii. a read-only memory operatively connected to said micro-instruction decoder and said instruction codes generating means; and d. display means operatively connected to said single-bus computer for presenting the processed instruction codes, said processed instruction codes applied to said display means via said single data bus means.

8. The programmable terminal as claimed in claim 7 including:

a. a source bus and a destination bus defining a single data bus;

b. said processor bus operator accepting data from said single data bus, modifying said data in accordance with a computationally complete instruction set defined by said micro-instruction decoder and read-only memory;

c. said micro-instruction decoder converting and decoding the data stored in said read-only memory into signals required by said processor bus operator;

d. said processed data generated by said processor bus operator being applied to said display via said single data bus.

9. The programmable teraminal as claimed in claim 8 including read-only micro-data memory means operatively connected to said single data bus, said read-only micro-data memory means being used for code conversion in adapting the terminal to several different communications codes.

10. The programmable terminal as claimed in claim 8 including a control bus operatively connected to said micro-instruction decoder for addressing and controlling said micro-instruction decoder.

11. The programmable terminal as claimed in claim 10 including read/write microprogrammed memory means communicating with said single data bus and said control bus, said read/write microprogrammed memory means operating to establish micro-instruction programs.

12. The programmable terminal as claimed in claim 10 including read/write macroprogram memory means communicating with said source bus, said destination bus, and said control bus, said read/write macroprogrammed memory means operating to program the terminal using macro-instructions.

13. A microprogrammed terminal comprising:

a. a source bus to which data is supplied;

b. a destination bus from which data is received, said source bus and said destination bus defining a single data bus;

c. a control bus for addressing and controlling subsystems of the terminal;

d. means for generating instruction codes, said instruction code generating means operatively connected to said single data bus;

e. a single-bus processor operatively connected to said single data bus, said single-bus processor accepting data from said single data bus and applying processed data to said single data bus;

f. a micro-instruction decoder operatively connected to said single-bus processor and said control bus;

g. a microprogrammed read-only memory operatively connected to said single data bus and said micro-instruction decoder;

h. timing and format generator means operatively connected to said single data and control buses;

i. a read/write microprogrammed memory operatively connected to said single data bus;

j. a read/write macroprogrammed memory operatively connected to said single data bus;

k. display means operatively connected to said timing and format generator means for presenting said instruction codes;

l. serial refresh memory means operatively connected to said display means for storing a complete page of text which is displayed by said terminal;

m. memory buffer register means operatively connected to said serial refresh memory means, said memory buffer register means operating as a source and destination of data;

n. character generator means operatively connected to said display means and timing and format generator means, said character generator means creating the specific alphanumeric symbol presented on said display means, said character generator means acting as a destination of data from said memory buffer register means on a cycle steal means basis.

14. The terminal as claimed in claim 13 wherein said micro-instruction decoder includes:

a. a destination address buffer operatively connected to said read-only memory;

b. a destination address outgating operatively connected to said destination address buffer;

c. wired OR circuit means operatively connected to said destination address outgating;

d. address bus drivers operatively connected to said wired OR circuit means;

e. class-of-instruction decoder means operatively connected to said destination address buffer and destination address outgating;

f. source address ingating means operatively connected to said read-only memory and wired OR circuit means;

g. literal load ingating means operatively connected to said read-only memory;

h. test logic means operatively connected to said literal load ingating means; and i. skip logic means operatively connected to said class-of-instruction decoder means and test logic means.

15. A programmable display terminal comprising:

a. source bus means for accepting instruction codes;

b. destination bus means from which data is received, said source bus means and said destination bus means defining single data bus means;

c. control bus means from which addressing data is supplied;

d. means operatively connected to said single data bus means for generating instruction codes;

e. a single-bus computer operatively connected to said single data bus means and control bus means for processing said instruction codes; and f. display means operatively connected to said single data bus means for presenting the processed instruction codes.

16. The display terminal as claimed in claim 15 wherein said single-bus computer includes:

a. a single-bus processor operatively connected to said single data bus means, said single-bus processor accepting data from said single data bus means and applying processed data to said single data bus means;

b. a micro-instruction decoder operatively connected to said control bus means and single-bus processor; and c. microprogrammed read-only memory operatively connected to said single data bus means and said micro-instruction decoder;

d. said processor bus operator accepting data from said single data bus means, modifying said data in accordance with a computationally complete instruction set as specified by said micro-instruction decoder and returning the processed data to said destination bus means;

e. said microprogrammed read-only memory communicating with said single data bus means, said microprogrammed read-only memory handling all permanent processing, data transfer, and diagnostic tests of the terminal.

17. The display terminal as claimed in claim 16 wherein said single-bus computer includes timing and format generator means operatively connected to said single data and control bus means.

18. The display terminal as claimed in claim 17 including serial refresh memory means operatively connected to said display means for storing a complete page of text which is displayed by said terminal on said display means.

19. The display terminal as claimed in claim 18 including memory buffer register means operatively connected to said serial refresh memory means, said memory buffer register means operating as a source and destination of data.

20. The display terminal as claimed in claim 19 including character generator means operatively connected to said display means and said single data bus means, said character generator means creating the specific alphanumeric characters presented on said display means, said character generator means acting as a destination of data from said memory buffer register means.

21. The display terminal as claimed in claim 15 including read-only micro-data memory means operatively connected to said single data bus means, said read-only micro-data memory means being used for code conversion in adapting the terminal to several different communications codes.

22. The display terminal as claimed in claim 15 including:

a. read-write microprogrammed memory means communicating with said single data bus means and said control bus means, said read/write microprogrammed memory means operating to establish micro-instruction programs; and b. read/write macroprogrammed means communicating with said single data bus means and said control bus means, said read/write macrorogrammed memory means operating to program the terminal using macro-instructions.

* * * * *